Nov. 13, 1923.
C. C. FORBES
1,474,251
GRAIN HEADING MACHINE
Filed June 16, 1922     4 Sheets-Sheet 2
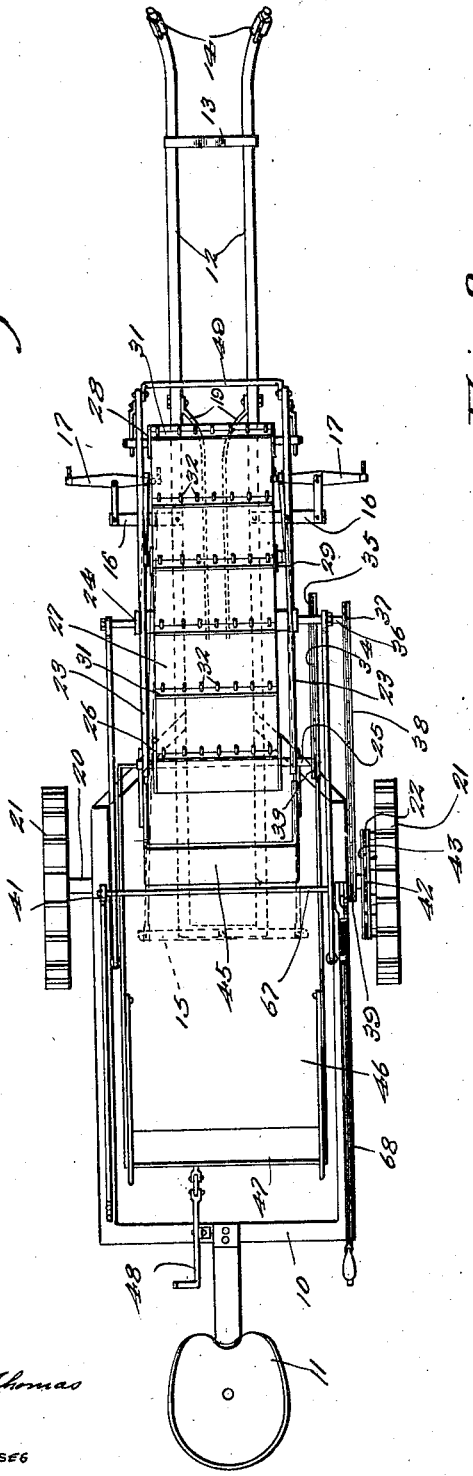

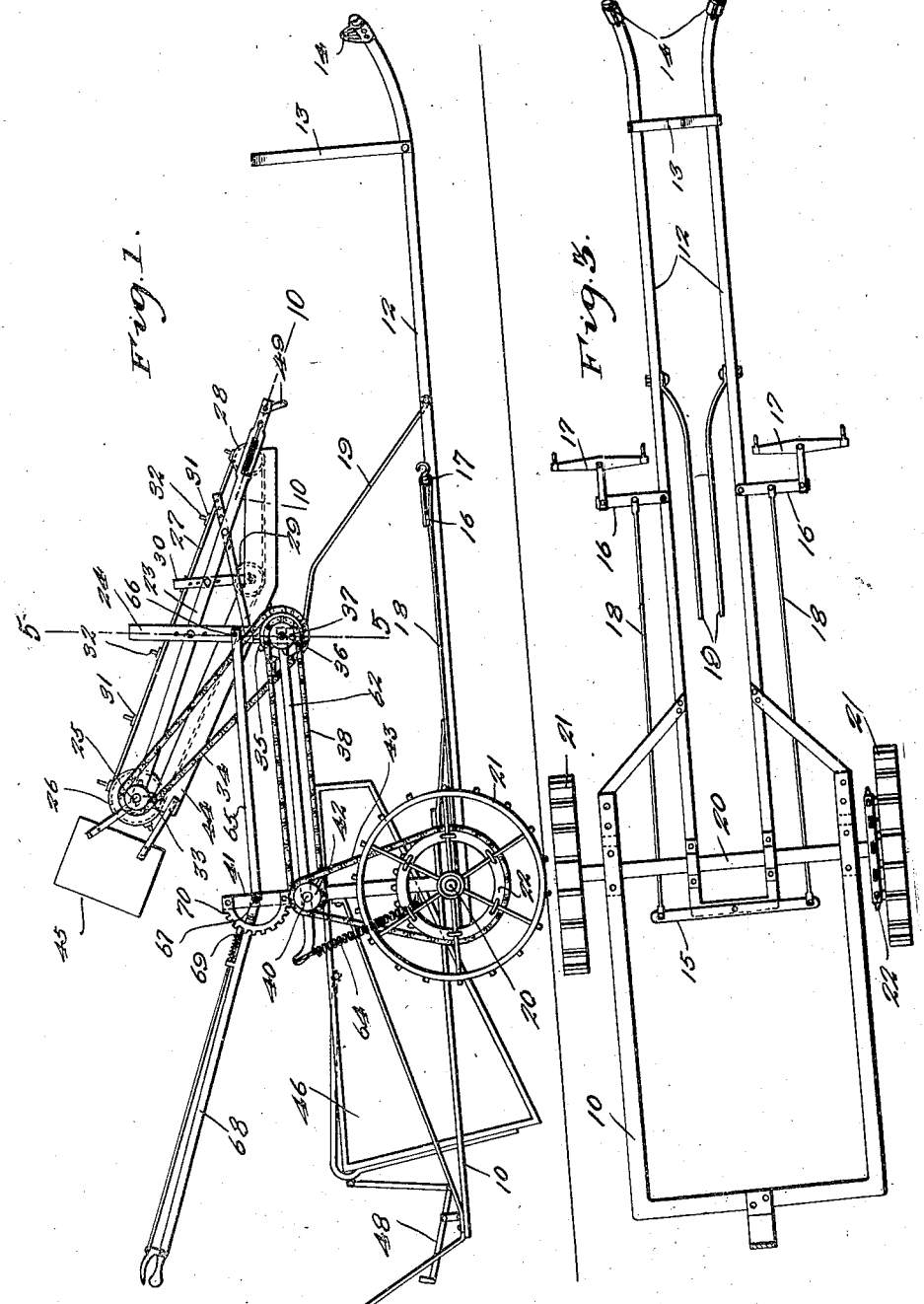

Nov. 13, 1923.　　　C. C. FORBES　　　1,474,251
GRAIN HEADING MACHINE
Filed June 16, 1922　　4 Sheets-Sheet 3
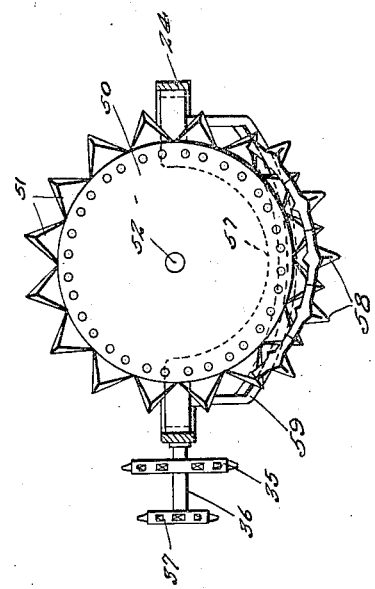
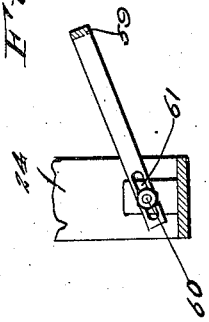
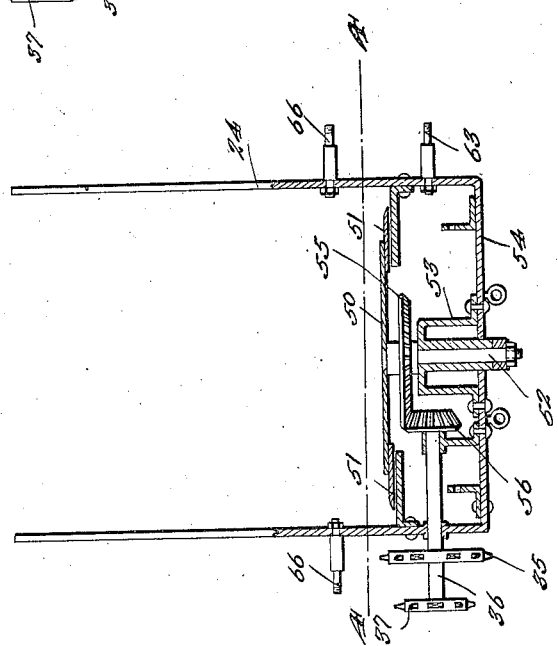
C. C. Forbes INVENTOR
BY *Victor J. Evans*
ATTORNEY
WITNESSES

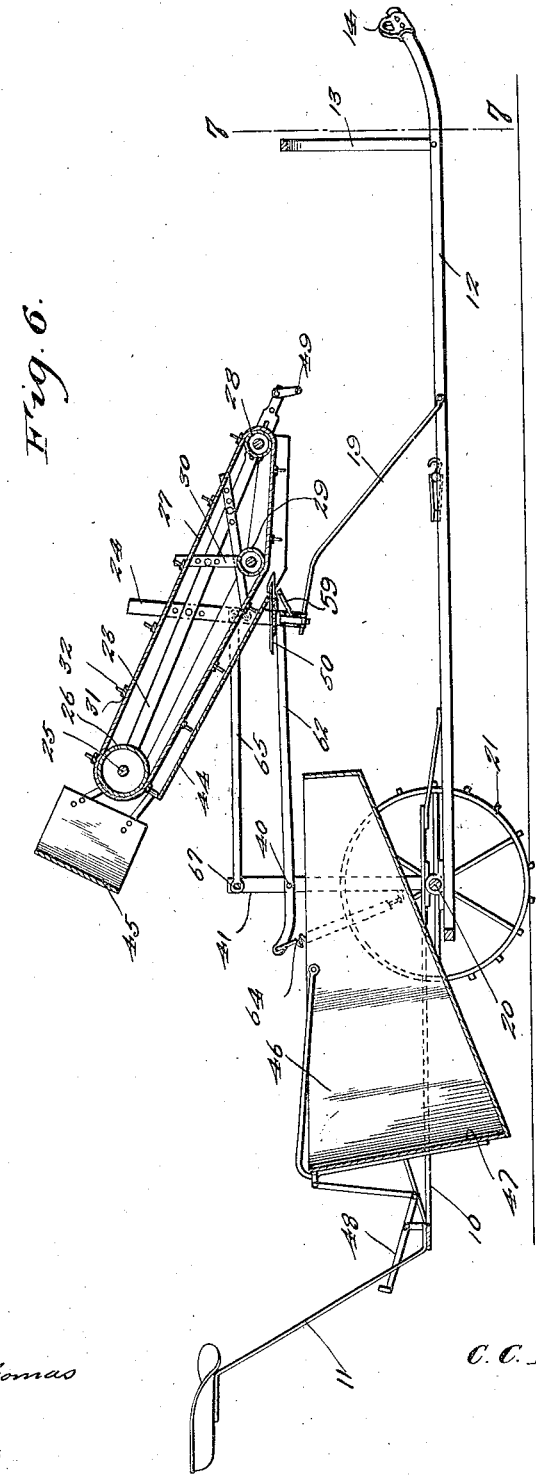

Patented Nov. 13, 1923.

1,474,251

UNITED STATES PATENT OFFICE.

CULLEN CURLEE FORBES, OF LUBBOCK, TEXAS.

GRAIN-HEADING MACHINE.

Application filed June 16, 1922. Serial No. 568,890.

*To all whom it may concern:*

Be it known that I, CULLEN CURLEE FORBES, a citizen of the United States, residing at Lubbock, in the county of Lubbock and State of Texas, have invented new and useful Improvements in Grain-Heading Machines, of which the following is a specification.

This invention relates to harvesting machinery, particularly to devices for heading grain such as sorghum, Kafir corn, milo and other crops, and has for its object the provision of a novel machine for this purpose which will cut the head from the stalk while the grain is standing in the field, the heads being collected within a suitable receptacle while the stalks are left standing so that the latter may be subsequently mowed, turned under or burnt as may be preferred.

An important object is the provision of a machine of this character which is provided with novel means whereby the heads will be cut evenly regardless of the height of the stalks, it being intended that the machine be adjusted initially to cut the lowest head, the higher heads being bent down and prevented from coming in contact with the cutting mechanism until they are in such position that the stalks will be cut at the same distance from the base of the head as the shortest stalks growing in the field.

Another object is the provision of a machine of this character which is adjustable whereby it may be used advantageously regardless of whether all the stalks grow high or low, this adjustment being necessary depending upon the character or nature of the grain to be harvested and the height of the heads above the ground.

Still another object is the provision of a machine of this character which is provided with an adjustment whereby the length of the stems left on the cut heads may be varied to meet various conditions of the crops, An additional object is the provision of a machine of this character which will be comparatively simple and inexpensive in manufacture, easy to operate and control, highly efficient in use, positive in action, durable in service and a general improvement in the art.

With the above and other objects and advantages in view, the invention consists in the details of construction to be hereinafter more fully described and claimed, and illustrated in the accompanying drawings, in which:—

Figure 1 is a side elevation of the complete device.

Figure 2 is a top plan view thereof.

Figure 3 is a plan view of the lower frame work.

Figure 4 is a detail sectional view on the line 4—4 of Figure 5.

Figure 5 is a cross sectional view taken through the machine at the point of location of the cutting mechanism, the view being on the line 5—5 of Figure 1.

Figure 6 is a longitudinal sectional view through the device on the line 6—6 of Figure 2.

Figure 7 is a detail cross sectional view showing the yoke connecting the tongues, the view being taken on line 7—7 of Figure 6.

Figure 8 is a detail view of the guard fingers.

Figure 9 is a detail view of the sickle disk.

Figure 10 is a detail section on the line 10—10 of Figure 1.

Figure 11 is a detail sectional view showing the sickle adjusting means.

Referring more particularly to the drawings, I have shown my device as comprising a rectangular lower frame 10 which has its rear portion carrying an upwardly extending seat 11 for the accommodation of the driver or operator, and which has its forward portion including a pair of spaced parallel tongues 12 which are designed to straddle the rows of grain being harvested, the tongues being connected at their forward ends by an upstanding U-shaped yoke or bracket 13 and terminating at their forward ends in outwardly curved portions 14 constituting breast yokes for the draft animals. Located within the frame 10 and at the rear ends of the spaced tongues 12 is an evener structure designated by the numeral 15 and carried by the tongues 12 in advance of the frame 10 are bars 16 which carry singletrees 17 and which are connected by rods 18 with the evener structure. The draft animals are of course hitched to the breast yokes 14 and the singletrees 17 and will be driven at opposite sides of the row of grain to be harvested.

Located at the intermediate portion of the double tongues 12 are upwardly and rearwardly inclined converging gatherings rods 19 which operate to gather together the grain in the row being travelled over for properly leading the grain to the cutting and conveying mechanism to be described. It should be stated that the entire frame 10 is supported upon a transversely arranged axle 20 which carries grounded engaging wheels 21, one of which carries a sprocket 22 for a purpose to be described.

Mounted considerably above the frame and tongues is a rectangular frame including bars 23 connected with a standard 24 at each side of the frame, the standards extending downwardly through the gathering members 19. Journaled through the frame is a shaft 25 carrying a roller 26 about which is trained an endless belt or apron 27 which is in turn trained about a roller 28 journaled at the forward portion of the frame, the belt or apron being also trained about an idler roller 29 located beneath the frame and carried by adjustable members 30 whereby this roller 29 will operate as a belt tightener. The roller 28 is likewise adjustable and by properly regulating the positions of the rollers 28 and 29 it will be apparent that the angular inclination of the lower forwardmost stretch of the belt or apron with respect to the horizontal may be regulated as may be found necessary in instances to be described. Secured transversely of the belt or apron 27 are slats or reinforcing members 31 each of which carries a plurality of spikes 32 of considerable length and which are for the purpose of dragging the several heads of the grain up to the receiving mechanism to be described. Secured upon the shaft 25 is a sprocket 33 about which is trained a chain 34 which is in turn trained about a sprocket 35 mounted upon a shaft 36 which is journaled transversely of the lower ends of the standards 24. Adjacent the sprocket 35 is a second sprocket 37 about which is trained a chain 38 which is in turn trained about a sprocket 39 mounted upon a shaft 40 which is journaled transversely of the standards 41 rising from the frame 10. Also secured upon the shaft 40 is a sprocket 42 about which is trained a chain 43 which is in turn trained about a sprocket 22 associated with the axle of the machine.

The frame comprised by the bars 23 is provided at its underside with a longitudinally extending upwardly and rearwardly inclined guard or shield 44 which is of angular formation and which is parallel with the lower inclined stretches of the belt or apron. At its intermediate portion this guard or shield is formed with an opening within which is located the sickle mechanism to be described. The purpose of the movable endless belt or apron carrying the spikes is to move upwardly along this guard or shield the head of the grain cut off by the sickle mechanism. Carried by the upper or lower rear end of the frame bars 23 is a deflector member 45 which is for the purpose of directing downwardly the severed heads of the grain into a receptacle 46 which is mounted within the main frame 10 and which is provided at its rear end with a vertically movable tail gate 47 which is adapted to be moved to open position by means of a suitable pedal 48 located beneath the seat 11 whereby the receptacle 46 may be dumped or emptied after it has become full. It is of course apparent that the top of this receptacle must be opened so as to receive the grain heads dropping down from the endless apron conveyor.

Secured at the lower or forward ends of the frame bars 23 is what I call a retarding bar 49 which acts as a fender and which engages against the heads of the successively tall stalks of grain and holds these heads away from the sickle mechanism until they are bent down at such an angle that they will pass under the forward portion of the shield or guard 44 and come into engagement with the sickle mechanism to be described. This retarding bar not only serves to force down the stalks of grain but also operates to reinforce the frame construction of the elevator or conveyor as will be readily apparent. This bar 49 is also adjustable as illustrated for the purpose of permitting it to be raised up or down so that it will accommodate varieties of grain having either long or short heads so that a variety having a long head may be cut with stems the same length from the base of the head as a variety having a short head.

Located within the opening referred to at the intermediate portion of the guard or shield 44 is the sickle which consists of a disk 50 carrying a plurality of cutting blades 51 arranged around the periphery thereof. This disk is mounted upon a stub shaft 52 journaled through a suitable bracket 53 and through a cross bar 54 connected with the lower ends of the standards 24. The disk carrying the cutting blades is rotated by means of a bevel gear 55 secured upon its underside and meshing with a bevel gear 56 carried by the shaft 36. Associated with this rotary cutter disk is a substantially semi-circular guard 57 suitably bolted in place and carrying a plurality of radially arranged guard fingers 58 which cooperate with the cutting blades 51 above referred to as clearly illustrated for the purpose of holding the grain stalks and heads to the blades so that the proper cutting action will be secured.

The number 59 designates a metal fulcrum placed directly under the cutter bar or sickle and this element is adjustable back and forth or up and down, it being bolted, as shown at 60, through a slot 61 to the frame holding the sickle. This bar for adjustment acts as a fulcrum for holding the heads of the grain out of the sickle until the proper time for cutting, that is until the belt has straightened the heads upright and in position to carry them directly on upward through the elevator or conveyor into the box. This fulcrum holding the heads out of the sickle until the belt has straightened them up properly thus prevents the heads from dropping in front of the sickle rather than being taken on through the conveyor by the belt as desired. The adjustment of this fulcrum also regulates the length of stem which is cut on the heads, this being a very important feature.

I also provide novel means for adjusting the position of the conveyor structure and its associated parts and this adjusting means comprises a pair of lower brace arms 62 which are disposed at either side of the machine or rather at both sides thereof and mounted on a pivot 63 at the lower end of each standard 24 and mounted upon other pivots, as for instance upon the shaft 40 at their rear portions. The extreme rear ends of these bars 62 are connected by stout springs 64 with the frame 10, the purpose of the springs being to counter-balance to a certain extent the weight of the elevator structure. I also provide a pair of rods or bars 65 which are disposed at opposite sides of the machine and which have their forward ends pivoted, as shown at 66 upon the standards 24 and which have their rear ends engaged upon a square shaft 67 having its ends journaled through the upper extremities of the standards 41. Mounted upon this square shaft is a rearwardly and upwardly inclined handle 68 which carries a grip released locking pawl 69 which cooperates with a notched segment 70 secured upon one of the standards 41. By this means it will be seen that when the lever 68 is moved up or down the frame carrying the conveyor structure will be likewise moved, the coil springs 64 operating to counterbalance a portion of the weight of the conveyor structure so as to facilitate the adjustment. When the lever 68 is moved it will be apparent that the entire conveyor structure and also the sickle or cutting mechanism will be moved in unison so as to maintain these parts in the same relative position and in the same plane with respect to the ground regardless of whether the conveyor structure be raised high or be disposed in a lowered position.

Assuming that the device has been constructed and assembled as above described, the operation is as follows: The device is drawn along the ground by a team of horses or other draft means with the tongues 12 straddling the row to be harvested. The grain will of course enter between the gathering members 19 and be held thereby and consequently led or directed to the sickle mechanism. Grain stalks of normal height will pass directly through the gathering members 19 and come in contact with the rotating cutting disk 50 while the unusually tall stalks will engage against the retarding bar 49 and be held down until such time as they may pass under the forward portion of the shield or guard 44 whereupon they will eventually come in contact with the cutting disk. The grain stalks being engaged by the disk will be severed thereby and owing to the fact that the endless belt 27 carrying the transverse slats and spikes is moving constantly it will be apparent that the cut heads will be dragged upwardly along the rear portion of the guard or shield 44 and will be ejected from the rear end thereof against the deflector 45 and from thence these cut heads will drop down into the box 46. It is to be noted that the lower side or bottom of this box is sharply inclined to the rear so that when the operator depresses the pedal 48 and consequently raises the end gate 47 the grain heads within the box will be dumped out onto the ground for subsequent collection. It is to be observed that by adjusting the position of the conveyor and sickle mechanism in unison that the device may be regulated for advantageous use for harvesting grain stalks of all heights, a notable feature being that ample provision is made for making adjustment whereby the points at which the stalks are cut with respect to the heads of the grain may be regulated.

From the foregoing description and a study of the drawings, it will be readily apparent that I have thus provided an easily controlled and operated machine by means of which standing grain may be headed in a very rapid and efficient manner and without loss of the grain heads. Owing to the simplicity of the construction and the fewness of the parts, it is apparent that there is practically nothing to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

What is claimed is:

1. A heading machine comprising a wheel supported frame including spaced parallel tongues connected by an arch member, draft means located at the outer side of the tongues, an evener located within the frame and connected with said draft means, a seat at the rear end of the frame, a receptacle carried by the frame, gathering elements located between said tongues and extending upwardly, a conveyor structure mounted above the frame, cutting mechanism located beneath the conveyor structure, and means for simultaneously driving the conveyor and cutter.

2. A heading machine comprising a wheel supported frame including spaced parallel tongues connected by an arch member, draft means located at the outer side of the tongues, an evener located within the frame and connected with said draft means, a seat at the rear end of the frame, a receptacle carried by the frame, gathering elements located between said tongues and extending upwardly, a conveyor structure mounted above the frame, cutting mechanism located beneath the conveyor structure, means for simultaneously driving the conveyor and cutter, and means for adjusting the vertical position of said conveyor structure and cutting mechanism as a unit.

3. A heading machine comprising a wheel supported frame provided with draft means, gathering elements carried by the frame, a receptacle supported by the frame, a conveyor structure mounted above the frame and discharging into said receptacle, a retarding bar located at the forward end of the conveyor structure for pressing down and holding back excessively high stalks of grain, a cutter located beneath said conveyor structure, said cutter consisting of a substantially horizontally disposed disk having its periphery provided with a plurality of cutting blades, and means for simultaneously driving said conveyor structure and said cutter disk.

4. A heading machine comprising a wheel supported frame provided with draft means, gathering elements carried by the frame, a receptacle supported by the frame, a conveyor structure mounted above the frame and discharging into said receptacle, a retarding bar located at the forward end of the conveyor structure for pressing down and holding back excessively high stalks of grain, a cutter located beneath said conveyor structure, said cutter consisting of a substantially horizontally disposed disk having its periphery provided with a plurality of cutting blades, means for simultaneously driving said conveyor structure and said cutter disk, and lever actuated means for shifting the position of the conveyor structure and cutter disk simultaneously with respect to the ground travelled over.

5. A header comprising a wheel supported frame, draft means located at opposite sides of the frame in advance thereof, gathering elements carried by the frame, a conveyor structure mounted in an inclined position above the frame and provided at its forward end with a retarding bar engaging the excessively high heads of grain, cutting means located beneath said conveyor, a shield at the bottom portion of the conveyor and extending from the cutting mechanism to a point at the rear of the conveyor structure, a system of levers connected with the conveyor structure and pivotally mounted with respect to said frame, an operating lever connected with said system of levers and provided with a grip release pawl, and a notched segment secured upon one of the standards with respect to the frame and cooperating with said pawl.

6. A header comprising a frame including spaced forwardly extending tongues connected by an arch, draft means mounted at opposite sides of the outer tongues, an evener mechanism connected with said draft means, an axle extending transversely of the frame and carrying ground engaging wheels, a seat carried by the rear end of the frame, gathering means carried by the tongues, a cutter mechanism located above the frame, a rearwardly discharging conveyor operating in conjunction with said cutter, a deflector mounted at the rear end of the conveyor structure, and a dumpable receptacle carried by the frame and having an open top located in position to receive grain from the conveyor structure.

7. A header comprising a wheel supported frame, a receptacle carried by the frame, gathering members carried by the frame at the forward portion thereof, a conveyor frame mounted above said first named frame, an endless conveyor apron trained over rollers journaled in said conveyor frame, a receptacle carried by the first named frame in position to receive grain heads discharged by said conveyor apron, means for adjusting the position of the conveyor structure, and a rotary cutter located beneath the conveyor apron at the intermediate portion thereof.

8. A header comprising a wheel supported frame, a receptacle carried by the frame, gathering elements carried by the frame at the forward portion thereof, a conveyor frame mounted above said first named frame, an endless conveyor apron trained over rollers journaled in said conveyor frame, a receptacle carried by the first named frame in position to receive grain heads discharged by said conveyor apron, means for adjusting the position of the conveyor structure, a rotary cutter located beneath the conveyor apron at the intermediate portion thereof, said conveyor frame including longitudinal bars and a pair of upright standards, the lower ends of said standards extending downwardly through said gathering elements, a plurality of bars pivotally connected with said standards and with the said first named frame, lever operated means associated with one pair of said last named bars for shifting the vertical position of the conveyor frame, and means operated by rotation of one of said ground engaging wheels for simultaneously driving said conveyor structure and said cutter disk.

In testimony whereof I affix my signature.

CULLEN CURLEE FORBES.